(No Model.) 2 Sheets—Sheet 2.
J. L. KNIGHT.
SEEDING MACHINE.
No. 306,161. Patented Oct. 7, 1884.
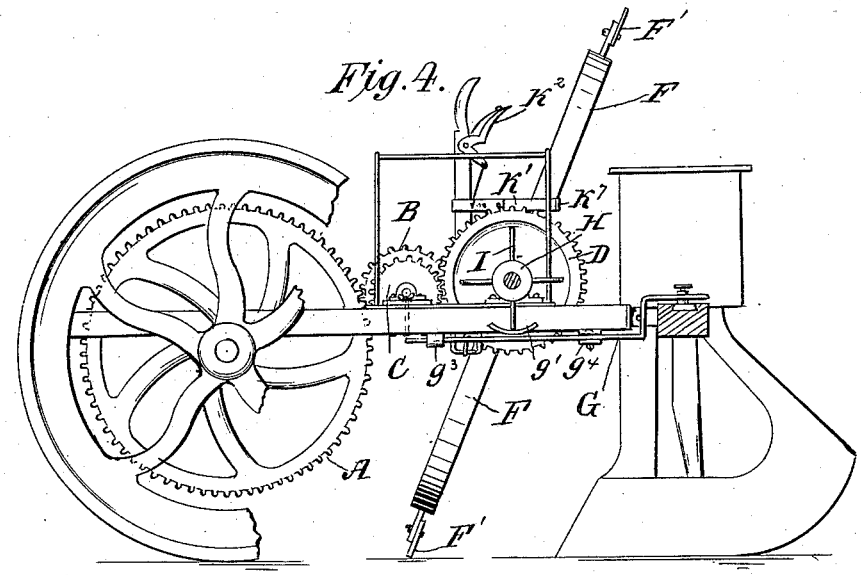
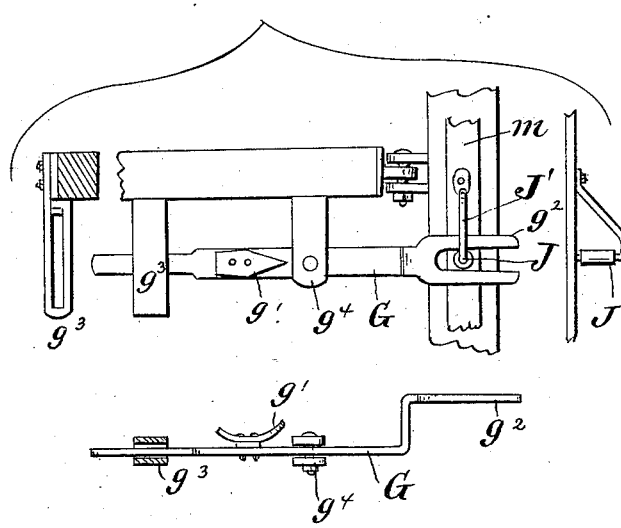
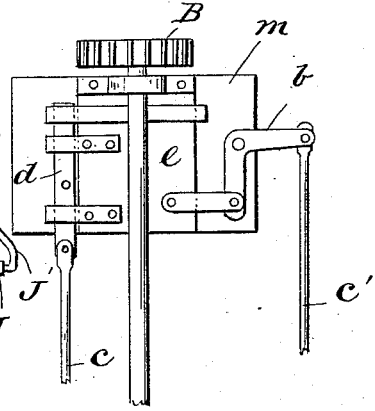
WITNESSES
Saml R. Turner
R. B. Inspire
INVENTOR
J. Lee Knight
By R. S. & A. P. Lacey ATTORNEYS

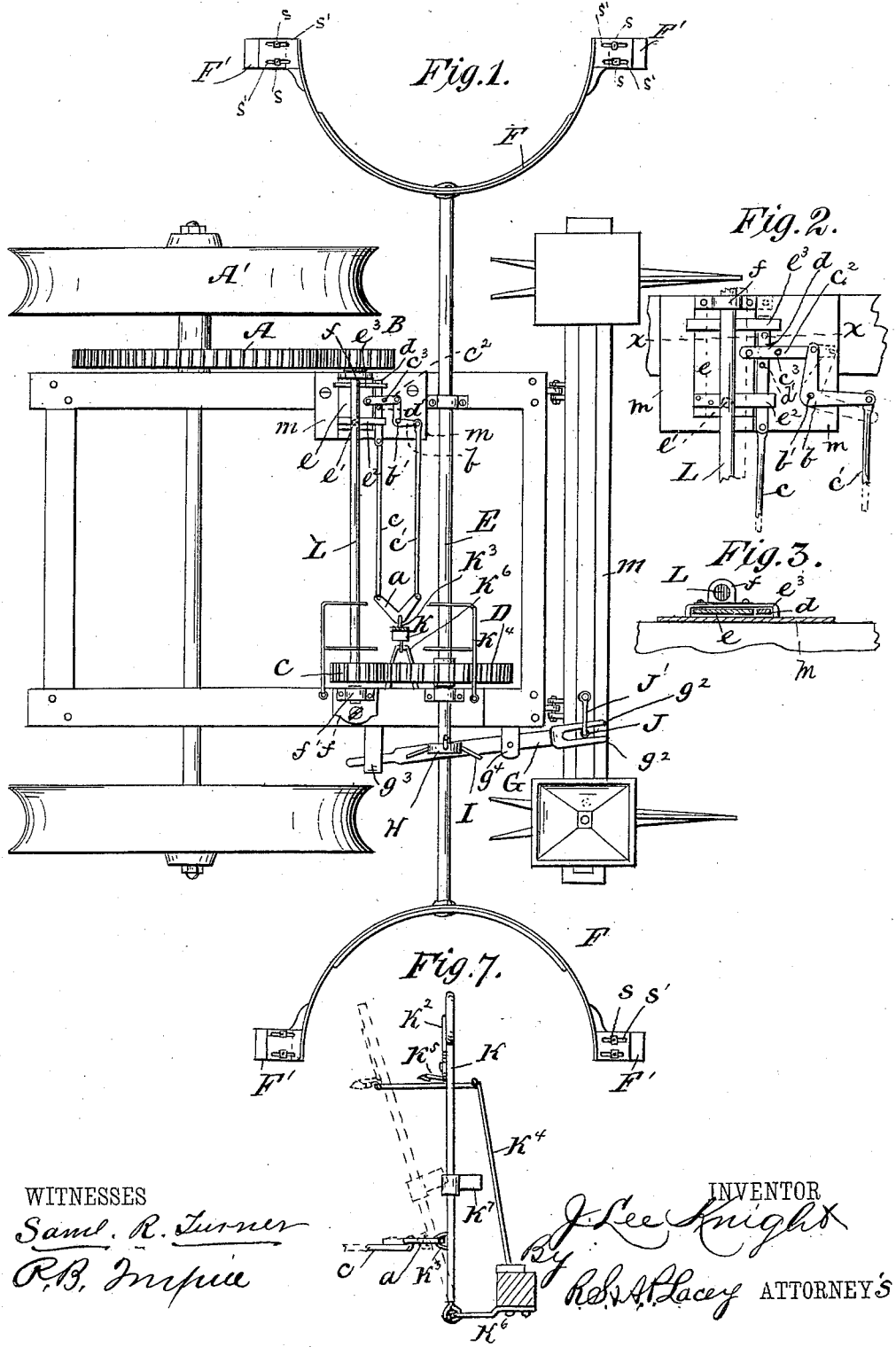

UNITED STATES PATENT OFFICE.

J. LEE KNIGHT, OF TOPEKA, KANSAS.

SEEDING-MACHINE.

SPECIFICATION forming part of Letters Patent No. 306,161, dated October 7, 1884.

Application filed June 27, 1883. (No model.)

*To all whom it may concern:*

Be it known that I, J. LEE KNIGHT, a citizen of the United States, residing at Topeka, in the county of Shawnee and State of Kansas, have invented certain new and useful Improvements in Seeding-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in adjustable automatic check-row seeding-machines; and it belongs to that class of devices for planting corn or other field crops in check-rows, so that it may be cultivated in the direction the rows were planted or at right angles to such direction, and in which the operations of spacing the distances apart and marking the position of the rows and dropping or planting the seed are all automatically performed by motive power derived from the revolution of the covering-wheels of the usual forms of corn or seed planters.

For convenience of definition I use the term "drive-wheels" in the following description, meaning thereby the wheels on which machines are mounted, and which serve the double purpose of supporting the frame-work and covering the seed planted.

In the drawings, Figure 1 is a plan view of a machine constructed according to my invention. Fig. 2 is a detail view on an enlarged scale. Fig. 3 is a cross-sectional view on line $x\,x$, Fig. 2. Fig. 4 is a side view of the machine. Fig. 5 shows the dropping mechanism in detail. Fig. 6 shows the arrangement of the parts whereby the use of an internally-geared power-wheel is made practicable, all of which will be described; and Fig. 7 is a detail view illustrating the lever K.

I am aware that various devices have been contrived to accomplish the ungearing of the dropping mechanism; but in the invention described herein I claim to have not only provided simple and complete means for automatic work, but the parts have the dual functions of enabling the operator to discontinue the automatic action at any moment of time, or position of the mechanism, or point in the field, and by hand continue the marking and dropping action to any extent found necessary to correct errors in the automatic action that may have arisen from irregularities in the surface of the ground, slipping of the drive-wheels, or from any other cause. He can also by the same means wholly discontinue the marking and dropping either automatically or by hand, thus placing the operation of the machinery and its results absolutely under the control of the operator at all times. These several results I obtain by converting the constant circular motion of the drive-wheel into such other motions by means of gears, links, the lever K, &c., and by the peculiar arrangement and operation of the same, as will be herein specifically described.

The adjustable automatic check-rower attachment is constructed of the power-wheel A, the transmitting-pinions B and C, the actuating-wheel D, the shaft E, the elastic arms F F, markers F′ F′, dropper-link G, the hub-collar H and adjustable pins I, the standard J, the two-way controlling-lever K, with spring-clutch K′, the pivot-links $a\,b$, the transmitting-links $c$, $c'$, and $c^2$, the lock-lug $d$, bearing-panel $e$, and pivot-bearings $f\,f'$ for the shaft L of the transmitting-pinions B and C, arranged to produce the specific results of operating the dropping mechanism of a planting-machine, and at the same time distinctly marking the rows both ways, whereby the operator may have means of knowing at all times whether the planting is being accurately done by the automatic action, and also the means of supplementing such action by hand for the correction of any errors or irregularities that may occur, all being supported on the necessary frame-work of the usual forms of double-row horse-power planters. The power gear-wheel A may be attached to and revolve with the drive-wheel A′, or the axle of the planter to which the check-rower is attached, and this wheel may be either exterior or interior spur-gear, as may be desired, and geared in any suitable manner with wheel B, as hereinafter will be described. The transmitting-pinions B C are fixed solid to the same axle L, the one B gearing with the power-wheel A, the other, C, gearing with the actuating-wheel D, which is mounted on the shaft E. The shaft E is journaled in the framing of and extends across the planter, and at its ends has the elliptic elastic marker-arms F F detachably connected. The projecting markers F' are fixed to the ends of the arms F F by screw-bolts s, passing through the slots s' in the markers, in order that they may be adjusted to greater or less depth of marking, as may be required by the condition of the ground. The arms F have also an appreciable degree of elasticity or spring, to adapt them to slight inequalities in the ground. To the shaft E is also fixed the hub-collar H, with suitable holes, in which the dropper-operating pins I are set and inclined alternately in opposite directions, as shown. The purpose of having more than two pins I is to enable the planter to be converted into a drill by removing the arms F and using as many pins I as will operate the dropper-slide as rapidly as may be desirable. The pins I may have collars on their outer ends, if rolling friction is wanted on the eccentric $g'$ of the dropper-link G. The standard J is fixed in a vertical position on the dropper-slide of the planter and secured from lateral vibration or pressure by the brace J'. It may have cylinder-covering, to afford rolling friction for the action of the arms $g^2$ of the link G. The dropper-link G has mounted on it, at a point vertically below the center of the shaft E, the eccentric $g'$, and at one end the arms $g^2$, which pass on either side of the standard J, while the other end passes back and forth in the guide $g^3$. It is pivoted to a fixed point or bearing, $g^4$, on the frame of the planter, having an oscillating motion derived from the action of the pins I on the eccentric $g'$, and converted into reciprocating motion on the dropping-slide m by the action of the arms $g^2$ on the standard J. The two-way controlling-lever K is pivoted at its lower end to a suitable fixed bearing or support, $K^6$, by means of a double eye-joint, as shown in Figs. 1 and 7, in such a manner that it is susceptible of being moved laterally to throw the mechanism in and out of gear, or longitudinally to revolve the actuating-wheel D, and thereby operate the dropping and marking mechanism by hand, as will be hereinafter described. It has the spring clutch or pallet K', operated by the pivoted handle $K^2$, and also the swivel-hook $K^3$, on which the pivot-link a operates. The pivot-link a has attached at its ends the transmitting-links c' and c, which at their other ends are attached, respectively, to the pivot-link b and lock-lug d. The pivot-link b is attached to the frame or supporting-plate m at its heel or center b', and one end is attached to the transmitting-link c'. The other is attached to the short link $c^2$, which in like manner has its other end attached to the pivot-panel e. One end of the transmitting-link c is attached to the pivot-link a, and the other is attached to the lock-lug d. The pivot-panel e is secured to the frame or plate m by the pivot-bolt e', as indicated in dotted lines, Figs. 1 and 2, and has fixed to it the guide $e^2$, the loop or staple $e^3$, inclosing the movable end of the panel, and the bearing f, in which the shaft L turns. The bearing is so attached to the panel e as to admit of a slight movement to adapt it to the position of the shaft when the pinion B is thrown out of gear. The lock-lug d is of same thickness of the pivot-panel e, and of proper width to slip freely alongside the panel, and with the panel fill the open space under the loop or staple $e^3$. The lug d has stop-pin d' to govern the extent of its motion, and the short link $c^2$ also has stop-pin $c^3$, which serves as one of the guides to keep the lug d in place. It is understood that all the links are connected by pivot-joints, and in practice these may be ordinary bolts with flat heads and screw-nuts, or such equivalent means as may serve the purpose. The controlling-lever K is surrounded by a frame or guide, $k^4$, and when in either the leaning or upright position may be held there by means of the cross-catch $k^5$, attached to the operating-rod of the spring-clutch K'. The detailed action of these several parts may now be stated. Assume that the pinion B is in gear with the power-wheel A. This places the pivot-panel e in the rear end of the loop $e^3$. The short link $c^2$ has drawn one end of the pivot-link b backward after the panel, while the other end of the pivot-link b has moved away from the location of the lever K, drawing with it the long link c', the one end of the pivot-link a, and partially drawn also the lever K. The lock-lug d, being pushed forward under the loop $e^3$ to lock the pivot-panel in place, and secure the gearing of the wheels, has drawn after it the link c, also followed by the other end of the pivot-link a, and completed the motion of the lever K. The result then is, that the lever K has been drawn to a slanting position, and the cross-catch $K^5$, projecting across the frame $K^4$, holds the lever in that position. The motion of the power-wheel A, being communicated through the pinions B and C to the wheel D, revolves the shaft E, the arms F, and markers F' are set in motion. One of the pins I, passing along the side of the eccentric $g'$, first moves it one direction, then the other pin moves it in the other direction, while the arms $g^2$, passing on either side of the standard J on the dropper-slide, push the slide back and forth, operating the drop mechanism, and coincident with these motions the markers F' penetrate and mark the ground in a line with the two hills of seed dropped, and laterally distant from each hill half the width of the rows. When the planter is turned around and proceeds in the opposite direction, one of the markers F' is made to step in the same marks made before, while its mate is making a new series of marks, in which it may in like manner be made to step on the next trip across the field. It will be seen that if this marking and again coming back with one shoe in its former marks can be accurately done the hills must be in perfect check or cross rows, while the projections of half a row's width each time will also mark the full width of the rows in the direction of the planting.

When it is desired to stop the automatic action, the operator simply presses the lever K from the slanting to a perpendicular position, a single motion, which is first communicated to the lock-lug $d$, withdrawing it from its locking position in the loop $e^3$, which allows the pivot-panel $e$ to turn or be drawn back. As soon as the lug $d$ is fully withdrawn, the stop-pin $d'$ stops its motion, and the pivot-link $a$ transfers the motion of the lever K to the link $c'$, which in like manner acts on the pivot-link $b$, and it, through the short link $c^2$, pulls the pivot-panel $e$ to the outer end of the staple $e^3$, which carries the pinion B out of gear. The lever K being now in a vertical position alongside the actuating-wheel D, the side spur or pin, K', of the spring-clutch K', by pressure on the handle $K^2$, is brought down between the cogs of the actuating-wheel D, and the lever, being moved forward or backward, revolves the shaft E in either direction, thereby performing the operations of marking and dropping by hand. If it be desired to simply cease dropping and marking altogether, as in turning at the ends or crossing places, where it is not desired to plant, the lever K is simply brought to the vertical position and held there by the cross-clutch $K^5$.

In Fig. 6 the locking-lug $d$ and the pivot-link $b$ are arranged on opposite sides of the pivot-panel $e$, and in such manner as to permit the wheel B to be moved rearwardly to throw the same out of mesh with a gear-wheel arranged in front thereof. This construction is especially adapted for use with an internally-geared power-wheel, and the operation thereof will be readily understood.

Having thus described my invention, what I claim, and desire to secure by Letters Patent, is—

1. The combination, with the power or driving gear, of the shaft carrying pinion B, and provided with means whereby motion may be communicated to the parts desired to be operated, said shaft being pivotally supported, whereby the pinion may be thrown into or out of engagement with the drive-gear, substantially as and for the purposes set forth.

2. The combination, substantially as hereinbefore set forth, of the power-wheel, the actuating-wheel, the shaft L, having wheels B C, one end supported on a pivot-plate, $e$, the locking-lug $d$ and link $b$, and means for operating lug $d$ and link $b$, as described.

3. In a check-row planting-machine, the combination, with the power and actuating wheel, of shaft L, having gear-wheels B C, having one end supported on pivot-plate $e$, the loop $e^3$, lug $d$, pivot-link $b$, connecting-links $c$ $c'$, L-shaped link $a$, swiveled to lever K, and lever K, swiveled at its lower end, and provided with clutch or pallet K', and adapted to operate the link $b$ and lug $d$ and throw the wheel B into or out of gear with the power-wheel, lock it there when in gear, and when the ungearing process is completed rest with its pallet K' in position to engage the actuating-wheel D, whereby the latter may be operated by hand, substantially as described.

4. In an automatic check-rower, the two-way lever K, adapted for the dual purposes of throwing the wheels in or out of gear and locking them when in gear, and also operating the mechanism by hand, with its pallet K' and swivel-hook $K^3$, in combination with the gearing-links and actuating-wheel, substantially as and for the purposes shown and described.

5. In an automatic check-rower, the combination of the links $a$ $b$ $c$ $c'$ $c^2$, lug $d$, and swivel-plate $e$, in connection with the transmitting-pinions B and C and controlling-lever K, substantially as and for the purposes shown and described.

6. In an automatic check-rower, the bearings $f$ $f'$, in combination with the movable axle L and transmitting-pinions B and C, as and for the purposes shown and described.

7. The combination, with the spring-arms F, of the markers F', adjustably secured on the outer ends of said arms, substantially as set forth.

8. The combination of shaft E, provided with pins I, inclined alternately in opposite directions, and the pivoted bar G, provided with a cam-plate, $g'$, arranged to be engaged by the pins I, and having its opposite faces inclined in opposite directions, substantially as set forth.

9. In an automatic check-rower, the dropper-link G, with eccentric cam $g'$ and actuating-arms $g^2$, in combination with the operating-pins I and standard J, substantially as shown and described.

In testimony whereof I affix my signature in presence of two witnesses.

J. LEE KNIGHT.

Witnesses:
THEO. WILKIE,
A. A. STEWART.